(12) United States Patent
Minamino et al.

(10) Patent No.: US 8,566,094 B2
(45) Date of Patent: Oct. 22, 2013

(54) INFORMATION PROCESSING APPARATUS, INFORMATION PROCESSING METHOD, AND PROGRAM

(75) Inventors: Katsuki Minamino, Tokyo (JP); Atsuo Hiroe, Kanagawa (JP); Yoshinori Maeda, Kanagawa (JP); Satoshi Asakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 127 days.

(21) Appl. No.: 13/206,631

(22) Filed: Aug. 10, 2011

(65) Prior Publication Data

US 2012/0053942 A1    Mar. 1, 2012

(30) Foreign Application Priority Data

Aug. 26, 2010   (JP) ................. P2010-189123

(51) Int. Cl.
*G10L 15/00*   (2013.01)
(52) U.S. Cl.
USPC .......................................... 704/251; 704/231
(58) Field of Classification Search
None
See application file for complete search history.

(56) References Cited

U.S. PATENT DOCUMENTS

| | | | |
|---|---|---|---|
| 6,292,779 B1 * | 9/2001 | Wilson et al. ............... | 704/257 |
| 6,964,023 B2 * | 11/2005 | Maes et al. .................. | 715/811 |
| 6,990,639 B2 * | 1/2006 | Wilson ......................... | 715/863 |
| 7,228,275 B1 * | 6/2007 | Endo et al. ................... | 704/235 |
| 8,219,406 B2 * | 7/2012 | Yu et al. ....................... | 704/275 |
| 8,359,020 B2 * | 1/2013 | Lebeau et al. ............... | 455/420 |
| 8,417,526 B2 * | 4/2013 | Bourdon ...................... | 704/252 |
| 2004/0215663 A1 * | 10/2004 | Liu et al. ..................... | 707/104.1 |
| 2006/0080098 A1 * | 4/2006 | Campbell ..................... | 704/243 |
| 2008/0071536 A1 * | 3/2008 | Nagashima .................. | 704/246 |
| 2008/0183462 A1 * | 7/2008 | Ma et al. ...................... | 704/9 |
| 2009/0125311 A1 * | 5/2009 | Haulick et al. ............... | 704/275 |
| 2009/0164216 A1 * | 6/2009 | Chengalvarayan et al. .. | 704/251 |
| 2009/0326936 A1 * | 12/2009 | Nagashima ................... | 704/235 |

FOREIGN PATENT DOCUMENTS

| | | |
|---|---|---|
| JP | 2006-53203 | 2/2006 |
| JP | 2006053203 A * | 2/2006 |

* cited by examiner

*Primary Examiner* — Richemond Dorvil
*Assistant Examiner* — Ernest Estes
(74) *Attorney, Agent, or Firm* — Finnegan, Henderson, Farabow, Garrett & Dunner, LLP

(57) ABSTRACT

An apparatus, method and program for performing a speech recognition process utilizing contextual information that comprises an estimation of the intention of an utterance of a user. The recognition process includes calculating a pre-score based on observed contextual information according intention models which correspond to a plurality of types of intention information and combining the pre-scoring results with acoustic and linguistic scores to obtain an improved recognition or comprehension of the intent of a user utterance.

9 Claims, 12 Drawing Sheets

FIG. 5

CONTEXT: PLAY

INTENTION: PLAY
FAST FORWARD
REWIND
MOVE TO NEXT MUSIC
MOVE BACK TO PREVIOUS MUSIC

CONTEXT: RECORD

INTENTION: START RECORDING
STOP RECORDING
RESUME RECORDING
SAVE DATA

CONTEXT: SEARCH

INTENTION: SEARCH BY NAME
SEARCH BY GENRE
SEARCH BY PLAYER

CONTEXT: SET

INTENTION: SET NAME
SET GENRE
SET PLAYER

FIG. 9

| CONTEXT (SELECTION CATEGORY) | | PLAY | RECORD | SEARCH | SET |
|---|---|---|---|---|---|
| INTENTION | PLAY | 0.9 | 0.2 | 0.2 | 0.1 |
| | FAST FORWARD | 0.8 | 0.1 | 0.2 | 0.2 |
| | REWIND | 0.9 | 0.1 | 0.1 | 0.1 |
| | MOVE TO NEXT MUSIC | 0.7 | 0.1 | 0.2 | 0.2 |
| | MOVE BACK TO PREVIOUS MUSIC | 0.6 | 0.1 | 0.1 | 0.2 |
| | START RECORDING | 0.2 | 0.9 | 0.05 | 0.01 |
| | STOP RECORDING | 0.1 | 0.9 | 0.02 | 0.02 |
| | RESUME RECORDING | 0.2 | 0.9 | 0.03 | 0.01 |
| | SAVE DATA | 0.2 | 0.8 | 0.01 | 0.02 |
| | SEARCH BY NAME | 0.05 | 0.04 | 0.8 | 0.1 |
| | SEARCH BY GENRE | 0.03 | 0.03 | 0.9 | 0.1 |
| | SEARCH BY PLAYER | 0.02 | 0.03 | 0.7 | 0.1 |
| | SET NAME | 0.01 | 0.02 | 0.3 | 0.8 |
| | SET GENRE | 0.01 | 0.01 | 0.2 | 0.9 |
| | SET PLAYER | 0.01 | 0.02 | 0.3 | 0.8 |

FIG. 10

| CONTEXT (VOICE INPUT PERSON) | | PERSON A | PERSON B |
|---|---|---|---|
| INTENTION | PLAY | 0.9 | 0.3 |
| | FAST FORWARD | 0.8 | 0.4 |
| | REWIND | 0.9 | 0.2 |
| | MOVE TO NEXT MUSIC | 0.7 | 0.3 |
| | MOVE BACK TO PREVIOUS MUSIC | 0.6 | 0.4 |
| | START RECORDING | 0.1 | 0.9 |
| | STOP RECORDING | 0.1 | 0.9 |
| | RESUME RECORDING | 0.1 | 0.8 |
| | SAVE DATA | 0.2 | 0.9 |
| | SEARCH BY NAME | 0.8 | 0.4 |
| | SEARCH BY GENRE | 0.7 | 0.3 |
| | SEARCH BY PLAYER | 0.9 | 0.3 |
| | SET NAME | 0.1 | 0.8 |
| | SET GENRE | 0.2 | 0.7 |
| | SET PLAYER | 0.1 | 0.9 |

FIG. 11

| CONTEXT (MICROPHONE IDENTIFICATION RESULT) | | LONG RANGE MICROPHONE | SHORT RANGE MICROPHONE |
|---|---|---|---|
| INTENTION | PLAY | 0.9 | 0.1 |
| | FAST FORWARD | 0.8 | 0.1 |
| | REWIND | 0.9 | 0.2 |
| | MOVE TO NEXT MUSIC | 0.7 | 0.1 |
| | MOVE BACK TO PREVIOUS MUSIC | 0.6 | 0.1 |
| | START RECORDING | 0.7 | 0.2 |
| | STOP RECORDING | 0.8 | 0.1 |
| | RESUME RECORDING | 0.6 | 0.1 |
| | SAVE DATA | 0.7 | 0.3 |
| | SEARCH BY NAME | 0.1 | 0.9 |
| | SEARCH BY GENRE | 0.2 | 0.8 |
| | SEARCH BY PLAYER | 0.1 | 0.9 |
| | SET NAME | 0.1 | 0.9 |
| | SET GENRE | 0.2 | 0.8 |
| | SET PLAYER | 0.1 | 0.9 |

INFORMATION PROCESSING APPARATUS, INFORMATION PROCESSING METHOD, AND PROGRAM

BACKGROUND

The present disclosure relates to an information processing apparatus, an information processing method, and a program. Specifically, the present disclosure relates to an information processing apparatus which performs a speech recognition process and a speech comprehension process estimating the intention of an utterance, and to an information processing method as well as a program.

In recent years, various products and services to which speech recognition is applied have been widely used. Speech recognition is a technique of analyzing speech signals input through a speech input portion such as a microphone and automatically determining a word group corresponding to the input speech signals. By combining the speech recognition technique and various applications, various products and services performing data processing based on the result of the speech recognition are realized.

A basic configuration of the speech recognition process will be described with reference to FIG. 1. A speech 11 input by a user is captured by a microphone 12, and an AD converter 13 samples the analog signals of the speech, thereby generating digital data. The digital data is input to a characteristic extraction portion 14, and through a frequency analysis or the like which is performed at proper time intervals, the data is converted into parameters showing a spectrum or other acoustic characteristics of the speech.

By the process of the characteristic extraction portion 14, a time series of the characteristic amount of the speech is obtained. The characteristic amount group is sent to a matching portion 15. The matching portion 15 matches the respective information of acoustic model data 16, dictionary data 17, and grammar data 18 with the input parameters, and outputs a speech recognition result 19.

Furthermore, in the characteristic extraction portion 14, in addition to the extraction of the characteristic amount group, a speech section is determined. The speech section corresponds to a section from the start time to the end time of an utterance. As a method of detecting the speech section, for example, a method of extracting only a section of an utterance based on the power or the like of a speech signal is used. The matching portion 15 performs a matching process with respect to the characteristic amount group corresponding to the speech section, thereby outputting the speech recognition result 19 for each utterance of the user.

The acoustic model data 16 is a model holding acoustic characteristics such as individual phonemes and syllables used in a language to be handled including, for example, Japanese or English. As this model, a Hidden Markov Model (HMM) or the like is used.

The dictionary data 17 is data holding information on the pronunciation of individual words to be recognized. By the data, words are associated with the acoustic model described above, and as a result, a standard acoustic pattern corresponding to individual words included in a dictionary is obtained.

The grammar data 18 is data in which the ways in which the individual words described in the dictionary can be catenated to each other are described. For the grammar data, a description based on a formal grammar or a context-free grammar, a grammar (N-gram) including a statistical probability of word catenation or the like is used.

In the matching portion 15, by using the acoustic model data 16, the dictionary data 17, and the grammar data 18, the most suitable word group for the input characteristic amount group is determined. For example, when the Hidden Markov Model (HMM) is used as the acoustic model data 16, a value which is obtained by accumulating a probability of the emergence of each characteristic amount according to the characteristic amount group is used as an acoustic evaluation value (hereinafter, referred to as an acoustic score). This acoustic score is determined for each word by using the standard pattern described above.

For example, when a bigram is used as the grammar data 18, the linguistic probability of each word is converted into a numerical value based on the probability that the word is catenated to the immediately preceding word, and the value is provided as a linguistic evaluation value (hereinafter, referred to as a linguistic score). Thereafter, the acoustic score and the linguistic score are evaluated comprehensively, whereby the most suitable word group for the input speech signal is determined.

For example, when a user says "The weather is nice today", a word group including "The", "weather", "is", "nice", "today" is obtained as a recognition result. At this time, an acoustic score and a linguistic score are provided to each word. Furthermore, in the present disclosure, a combination of the dictionary data 17 and the grammar data 18 as described above is referred to as a linguistic model.

When the speech recognition technique is applied to a product and a service, the following two methods are widely used.

(a) A method of directly associating a recognized word group with the corresponding behavior.

(b) A method of extracting the intention of the user included in the utterance from a recognized word group and associating the intention with the corresponding behavior.

For example, when an utterance "stand up" is given to a robot, a method of causing the robot to stand up in response to the recognized word group "stand up" is the former (a) method, that is, the method of directly associating the words with the corresponding behavior.

On the other hand, a method of estimating the intention (for example, intention of "stand up please") included in each utterance such as "stand up", "wake up", and "get up", and causing the robot to act in response to the intention is the latter (b) method. That is, this is a method of extracting the user's intention included in the utterance and associating a corresponding behavior with the intention.

In general, since there is a plurality of types of utterance including the same intention, compared to the former (a) method of directly assigning a corresponding behavior to the recognized word group, the latter (b) method of estimating the intention of the utterance and assigning a corresponding behavior to the intention can more easily assign the behavior. In this manner, an apparatus estimating the intention of an utterance from input speech signals is called a speech comprehension apparatus.

As a technique in the related art describing a method of estimating the user's intention included in an utterance, for example, there is a Japanese Unexamined Patent Application Publication No. 2006-53203 "SPEECH PROCESSING DEVICE AND METHOD, RECORDING MEDIUM AND PROGRAM".

In the method described in Japanese Unexamined Patent Application Publication No. 2006-53203, a technique of estimating intention (although intention is referred to as "will" in Japanese Unexamined Patent Application Publication No. 2006-53203, the "will" will be referred to as "intention" having the same meaning in the following description as long as this does not cause confusion) based on input speech signals is described. In Japanese Unexamined Patent Application Publication No. 2006-53203, acoustic score calculation means showing acoustic similarity between a word group, which is configured based on grammar rules and a word dictionary, corresponding to intention information showing an intention, for example, "stand up please" as an intention and input speech signals, and linguistic score calculation means showing linguistic similarity are provided, and intention information showing the intention corresponding to the input speech signals is selected from a plurality of types of intention information based on the acoustic and linguistic scores calculated for each intention information, whereby the intention is estimated.

However, generally, as the total amount of the intention information increases, the accuracy of estimating intention with respect to the input speech decreases, and the calculation amount increases.

For example, specifically, if an information processing apparatus processing information based on the speech recognition is a television which includes a function of recording and playback, a user can make a plurality of different requests (intention) with respect to the television, such as "please change the channel", "please turn the volume up", "please record", "please play", "please play with fast forward", and "please play slowly".

In this manner, in the apparatus which is likely to receive various types of requests, when the acoustic score calculation means showing the similarity between a word group and the speech signals described above and the linguistic score calculation means showing the linguistic similarity are applied to perform a process of selecting the intention information showing the intention corresponding to the input speech signals from a plurality of types of intention information, the calculation amount necessary for the process increases, so the accuracy of intention estimation decreases.

SUMMARY

The present disclosure has been made in consideration of the above problems, and it is desirable to provide an information processing apparatus in which intention estimation can be performed efficiently and very accurately based on speech recognition, and an information processing method as well as a program.

A first embodiment of the present disclosure is an information processing apparatus including a pre-score adjustment portion which calculates a pre-score based on context information obtained as observation information, for an intention model as a unit corresponding to each of a plurality of types of intention information registered in advance; a multi-matching portion which determines the most suitable word group for an input speech based on a user's utterance and calculates an acoustic score and a linguistic score to be given to the word group for the intention model as a unit; and an intention determination portion which determines intention information corresponding to an intention model achieving the highest total score as an intention corresponding to the user's utterance by comparing a total score calculated from the pre-score, the acoustic score, and the linguistic score of the intention model as a unit.

In the embodiment of the information processing apparatus of the present disclosure, the observation information may include a plurality of types of observation information, the apparatus may further include a pre-score storing portion in which a pre-score corresponding to a context with respect to each context information corresponding to the plurality of different types of observation information has been registered, and the pre-score adjustment portion may select the pre-score corresponding to a context that has been registered in the pre-score storing portion based on the context information and calculate a pre-score for the intention model as a unit by applying the selected pre-score corresponding to the context.

In the embodiment of the information processing apparatus of the present disclosure, the context information as the observation information may include at least any one of information (a) to (c) including (a) process category information selected by a user, which is input from an input and output portion;

(b) information of speech input person identification input from an image processing portion; and (c) information of speech input microphone identification input from a microphone determination portion, and the pre-score adjustment portion may select the pre-score corresponding to a context that has been registered in the pre-score storing portion based on the context information and calculate the pre-score for the intention model as a unit by applying the selected pre-score corresponding to the context.

In the embodiment of the information processing apparatus of the present disclosure, the process category information selected by a user may be information selected by the user from the process category information displayed on a display portion by the information processing apparatus which performs the process, and the pre-score adjustment portion may select the pre-score corresponding to a context which corresponds to a process category selected by the user and calculate the pre-score for the intention model as a unit by applying the selected pre-score corresponding to the context.

In the embodiment of the information processing apparatus of the present disclosure, the information of speech input person identification may be an identified result of a face identification process executed by the image processing portion based on an image captured by a camera of the information processing apparatus. The pre-score adjustment portion may select the pre-score corresponding to a context which corresponds to the speech input person identified, and calculate the pre-score for the intention model as a unit by applying the selected pre-score corresponding to the context.

In the embodiment of the information processing apparatus of the present disclosure, the information of speech input microphone identification may be information of a microphone determined to be a microphone from which the speech has been input, which is obtained by the microphone determination portion of the information processing apparatus. The pre-score adjustment portion may select the pre-score corresponding to a context which corresponds to the microphone from which the speech has been input, and calculate the pre-score for the intention model as a unit by applying the selected pre-score corresponding to the context.

In the embodiment of the information processing apparatus of the present disclosure, the intention determination portion may calculate a total score for the intention model as a unit by applying pre-set weight corresponding to each of the acoustic score, linguistic score, and pre-score.

In the embodiment of the information processing apparatus of the present disclosure, the information processing apparatus may further include a pre-score learning portion which receives the input of the determination result of the pre-score determination portion and updates the pre-score corresponding to a context that has been registered in the pre-score storing portion by a learning process performed based on input determination results.

A second embodiment of the present disclosure is an information processing method executed in an information processing apparatus, the method including causing a pre-score determination portion to calculate a pre-score based on context information obtained as observation information, for an intention model as a unit corresponding to each of a plurality of intention information registered in advance; causing a multi-matching portion to determine the most suitable word group for an input speech based on a user's utterance and an acoustic score and to calculate a linguistic score to be given to the word group for the intention model as a unit; and causing an intention determination portion to determine intention information corresponding to an intention model achieving the highest total score as the intention corresponding to the user's utterance by comparing the total scores calculated from the pre-score, acoustic score, and the linguistic score of the intention model as a unit.

A third embodiment of the present disclosure is a program causing an information processing apparatus to perform information processing, the program including causing a pre-score adjustment portion to calculate a pre-score based on context information obtained as observation information, for an intention model as a unit corresponding to each of a plurality of types of intention information registered in advance; causing a multi-matching to determine the most suitable word group for an input speech based on a user's utterance and to calculate an acoustic score and a linguistic score to be given to the word group for the intention model as a unit; and causing an intention determination portion to determine intention information corresponding to an intention model achieving the highest total score as the intention corresponding to the user's utterance by comparing the total scores calculated from the pre-score, the acoustic score, and the linguistic score of the intention model as a unit.

The program of the embodiment of the present disclosure can be provided to an information processing apparatus and a computer system that can execute various types of program codes, by a recording medium or a communication medium provided in a computer readable form. By providing the program in the computer readable form, a process is realized in response to the program in the information processing apparatus or computer system.

Other desirable embodiments, characteristics, and advantages of the present disclosure will be further clarified by the following detailed description based on the embodiments and attached drawings of the present disclosure. Furthermore, the system in the present specification is a logical collective configuration of a plurality of devices, and each configurative device is not limited to be in the same case.

According to a configuration of the embodiments of the present disclosure, an apparatus and a method of determining a user's intention based on the user's utterance are realized. The apparatus includes a pre-score adjustment portion which calculates a pre-score based on context information obtained as observation information, for an intention model as a unit corresponding to each of a plurality of types of intention information registered in advance; a multi-matching portion which determines the most suitable word group for an input speech based on a user's utterance and calculates an acoustic score and a linguistic score to be given to the word group for the intention model as a unit; and an intention determination portion which determines intention information corresponding to an intention model achieving the highest total score as the intention corresponding to the user's utterance by comparing the total scores calculated from the pre-score, the acoustic score, and the linguistic score of the intention model as a unit, and the user's intention corresponding to the user's utterance is determined by comparing the scores of the intention model as a unit. By the present disclosure, in the apparatus estimating the intention of the utterance from the input speech signals, the pre-score can be adjusted using various types of observation information as contexts, and as a result, the accuracy of the intention estimation can be improved.

BRIEF DESCRIPTION OF THE DRAWINGS

FIG. 5 is a view illustrating an example of intention information corresponding to a process category of a process executed by the information processing apparatus according to an embodiment of the present disclosure.

FIG. 9 is a view illustrating an example of data registered in a pre-score storing portion of the information processing apparatus according to an embodiment of the present disclosure.

FIG. 10 is a view illustrating an example of data registered in a pre-score storing portion of the information processing apparatus according to an embodiment of the present disclosure.

FIG. 11 is a view illustrating an example of data registered in a pre-score storing portion of the information processing apparatus according to an embodiment of the present disclosure.

Hereinafter, the information processing apparatus, the information processing method and the program of the present disclosure will be described in detail with reference to drawings, and the description will be made according to the following articles.

1. The outline of the process executed by the information processing apparatus of the present disclosure 2. The configuration and the specific process of the information processing apparatus of the present disclosure 3. The example of the hardware configuration of the information processing apparatus

[1. The Outline of the Process Executed by the Information Processing Apparatus of the Present Disclosure]

Figure 2:
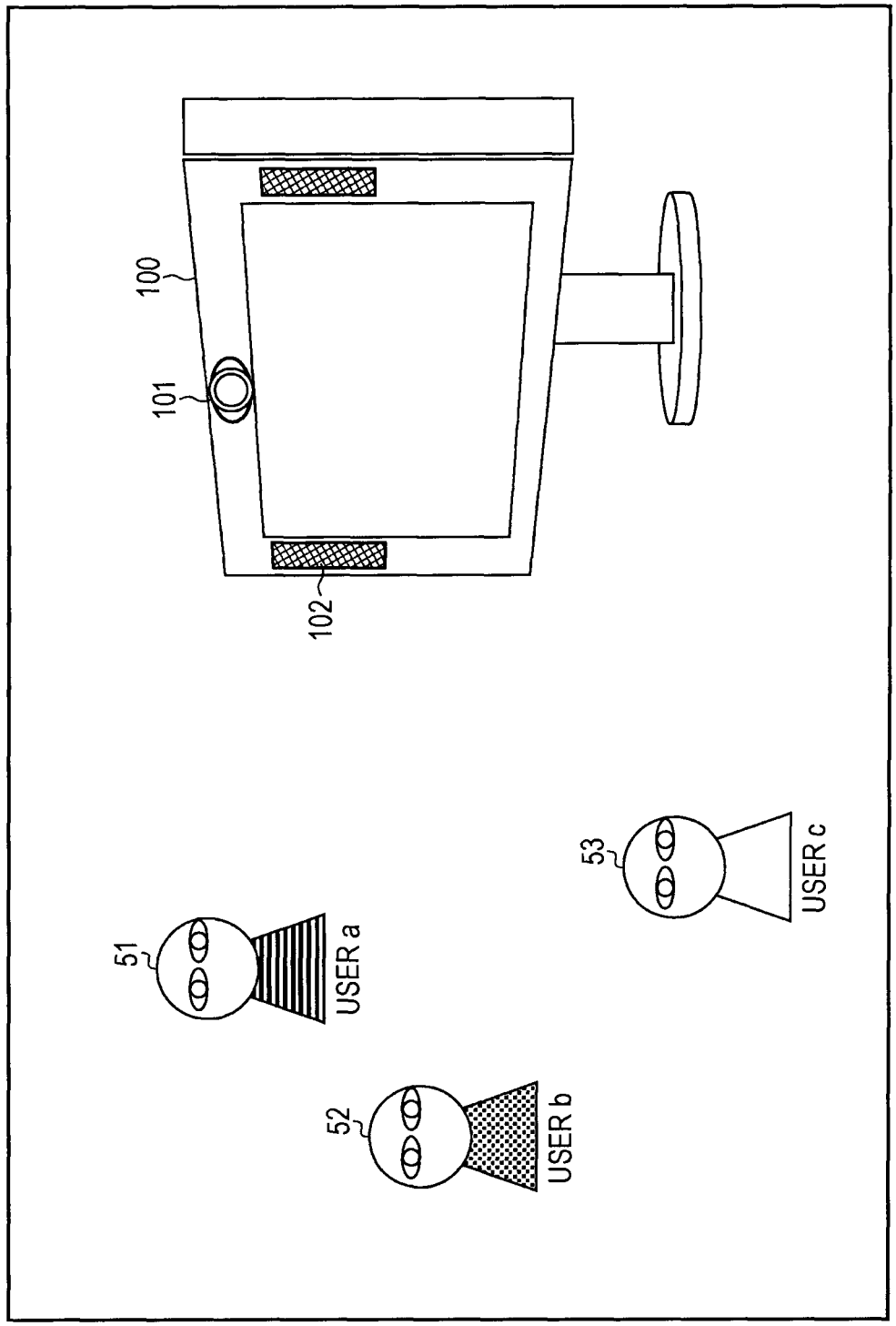
FIG. 2 is a view illustrating an outline of a process executed by an information processing apparatus according to an embodiment of the present disclosure.

First, the outline of the process executed by the information processing apparatus of the present disclosure will be described with reference to FIG. 2. FIG. 2 illustrates a television having a function of recording and playback as an example of the information processing apparatus according to the present disclosure. An information processing apparatus 100 executes, for example, a process of playing contents recorded in built-in recording and playing devices such as a hard disk, a DVD, and a Blu-ray disc and a process of recording a program to the recording and playing device as well as a process of displaying broadcasting contents.

There is a plurality of users in front of the information processing apparatus 100. In the example shown in the drawing, there are a user a 51, a user b 52, and a user c 53. These users make various types of requests with respect to the information processing apparatus 100. For example, they request a change of channel, volume adjustment, starting a recording process, displaying a list of recorded contents, playing a content selected from the list, stop playing, fast forward, and the like.

The users make those requests through speech, that is, through utterances. The information processing apparatus 100 includes a speech input and output portion 102 provided with a camera 101, a microphone, and a speaker. The words from the users a 51 to c 53 are input in the information processing apparatus 100 through the speech input and output portion 102 provided with the microphone and speaker. In addition, the images of the users a 51 to c 53 are input into the information processing apparatus 100 through the camera 101.

The information processing apparatus 100 analyzes this input information, determines actions to be executed by the apparatus, and executes the actions. When the apparatus understands the user's request, the apparatus executes a process in response to the request. Examples of the process include a change of channel, selecting and playing content, and the like.

[2. The Configuration and the Specific Process of the Information Processing Apparatus of the Present Disclosure]

Next, the configuration and the specific process of the information processing apparatus of the present disclosure will be described with reference drawings from FIG. 3. An information processing apparatus 200 shown in FIG. 3 corresponds to the information processing apparatus 100 shown in FIG. 2, for example. The information processing apparatus of the present disclosure is not limited to the television, but can be realized as a PC, a recorder with player, and various types of other home appliances. That is, the information processing apparatus of the present disclosure is an apparatus executing various types of processes in response to the user's request.

Figure 1:
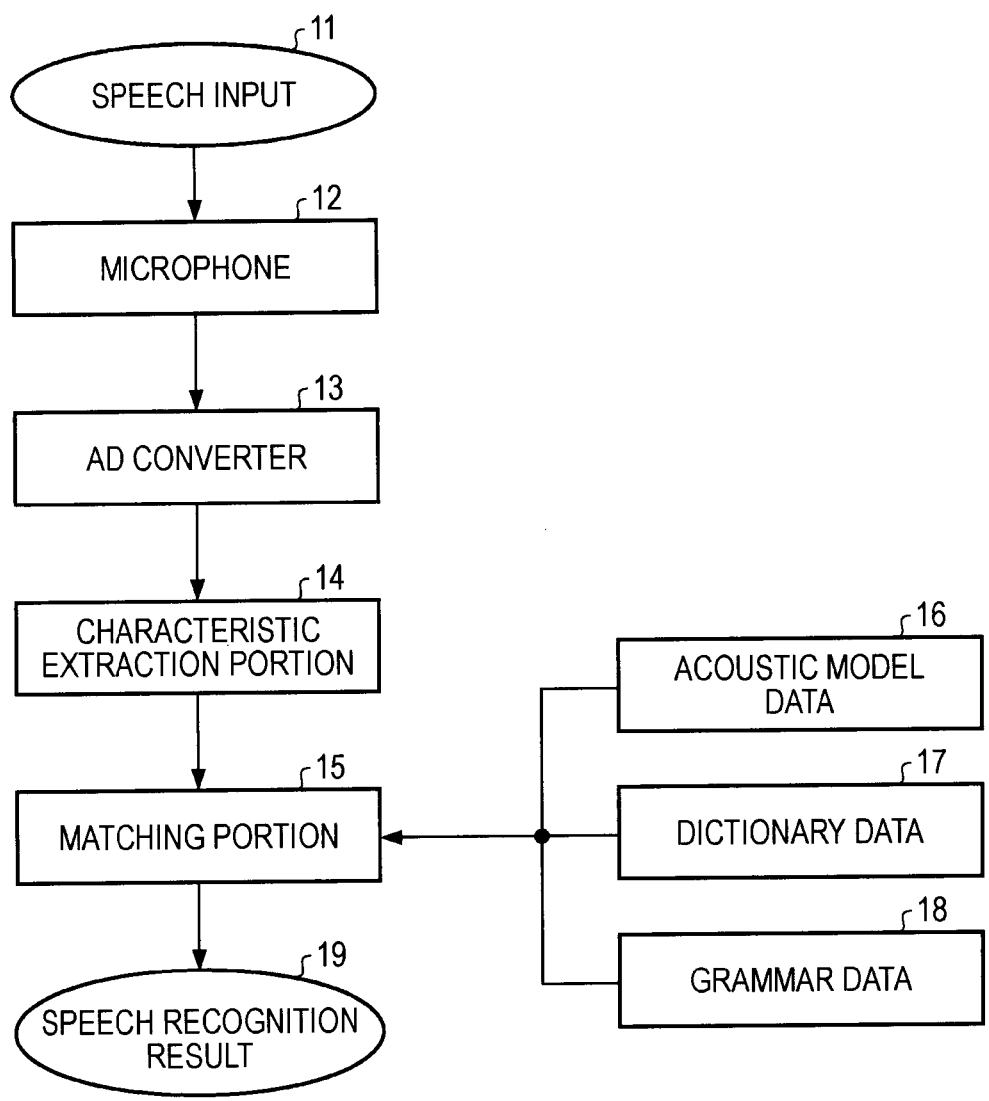
FIG. 1 is a view illustrating a basic configuration of a speech recognition process.

The basic configuration of the speech recognition process was described as above with reference to FIG. 1. In the information processing apparatus 200 shown in FIG. 3, a speech input 201, an AD converter 205, a characteristic extraction portion 206, and an acoustic model 208 have the same configuration as the configuration described above with reference to FIG. 1, so the configurations will be simplified in the following description.

The information processing apparatus 200 of the present embodiment is provided with two microphones including a short range microphone 202 and a long range microphone 203 as well as a microphone determination portion 204 determining which microphone is used by the user. The short range microphone 202 is a microphone used on the assumption that the distance between the user and the microphone is short. For example, the short range microphone 202 corresponds to a microphone that the user holds by hand to speak, and a microphone provided in a remote control or the like that the user holds by hand to use. On the other hand, the long range microphone 203 is a microphone used on the assumption that the distance between the user and the microphone is long. For example, the long range microphone 203 corresponds to a microphone installed in a ceiling, a wall, and a television, which is used on the assumption that the user speaks at a place slightly distant from the microphone.

The microphone determination portion 204 is used for determining which one between the short range microphone 202 and the long range microphone 203 the user uses to input speech (utterance). For example, when the user inputs the speech while pressing a button provided in the short range microphone, the speech is determined to be input through the short range microphone, and when the user inputs the speech by speaking without pressing the button, the speech is determined to be input through the long range microphone, whereby it is possible to determine which microphone the user uses to input speech.

In this case, based on whether the user presses the button, the microphone determination portion 204 makes determinations. To the AD converter 205, only the speech signals input from the microphone which has been determined to be used for the user to input speech by the microphone determination portion 204 are transmitted. Furthermore, the determination result of the microphone determination portion 204 is transmitted to a context determination portion 216 as a piece of context information. The context determination portion 216 will be described later in detail.

The AD converter 205 samples analog signals corresponding to the speech signals input from the microphone, thereby generating digital data. The digital data is input in a characteristic extraction portion 206, followed by frequency analysis or the like at appropriate time intervals, and then converted into parameters showing spectrums or other acoustic characteristics of the speech. By the process of the characteristic extraction portion 206, a characteristic amount group which is time-series data of the characteristic amount of the speech is obtained.

The characteristic amount group extracted in the characteristic extraction portion 206 is transmitted to a multi-matching portion 207. Based on the characteristic amount group transmitted from the characteristic extraction portion 206 and an intention model A (209-A) to an intention model N (209-N), the multi-matching portion 207 calculates a score with respect to each intention model. The method of calculating the score will be described later.

The intention model A (209-A) to intention model N (209-N) are set as models corresponding to each intention estimated based on the user's utterance. These intentions are registered in association with items of request that the user will make with respect to the information processing apparatus. Although the detailed description thereof will be made later, in the apparatus of the present disclosure, for example, the intention models A to N (209-A to N) corresponding to the following A to N:15 types of intention information shown in FIG. 5 are set.

Intention information A=[play]
Intention information B=[fast forward]
. . .
Intention information N=[set player]

The intention model A (209-A) to intention model N (209-N) are configured based respectively on the following data.

(1) Intention information A (209-A1) to intention information N (209-N1)
(2) Pre-score A (209-A2) to Pre-score N (209-N2)
(3) Dictionary A (209-A3) to Dictionary N (209-N3)
(4) Grammar A (209-A4) to Grammar N (209-N4)

For example, the intention model A (209-A) includes the following data having the intention model A (209-A1), the pre-score A (209-A2), the dictionary A (209-A3), and the grammar A (209-A4).

The intention information is information showing to what intention each intention model corresponds. For example, the following intention information shown in FIG. 5 is registered as the intention information A to N (209-A1 to N1) of each of the intention models A to N (209-A to N).

Intention information A=[play]
Intention information B=[fast forward]
...
Intention information N=[set player]

The pre-score is a score provided in advance to each intention model. A process of calculating the score will be described later.

The dictionary is configured with vocabularies defined according to the intention information and includes the same function as a dictionary 17 in FIG. 1. That is, the dictionary is data holding information on the pronunciation of each word to be recognized. In this manner, words are associated with the acoustic models described above. As a result, a standard acoustic pattern corresponding to each word included in the dictionary is obtained.

The grammar is configured with bigram grammar or trigram grammar that can present a catenation probability of the words held in the dictionary. Particularly, the grammar is configured as a grammar giving a high score to a word group showing the intention information and includes the same function as the grammar 18 in FIG. 1. That is, the grammar is the data describing how individual words described in the dictionary will be catenated, and as the grammar, description based on a formal grammar or a context-free grammar, a grammar (N-gram) including statistical catenation probability of word linkage, and the like are used.

The multi-matching portion 207 includes a plurality of calculation portions such as an acoustic score calculation portion 207a, a linguistic score calculation portion 207b, and a pre-score calculation portion 207c.

In the multi-matching portion 207, the acoustic model 208 as described with reference to FIG. 1 and a plurality of intention model A (209-A) to intention model N (209-N) are used to determine the most suitable word group for the input speech for each intention model, and the acoustic score and the linguistic score with respect to the respective word groups are calculated.

As described above with reference to FIG. 1, the acoustic model 208 holds the acoustic characteristics such as individual phonemes and syllables used in a language to be handled including, for example, Japanese or English. As this model, a Hidden Markov Model (HMM) or the like is used.

As described above, each of the intention model A (209-A) to intention model N (209-N) includes the following components corresponding to each of the intention models A to N.

Dictionary A (209-A3) to Dictionary N (209-N3)
Grammar A (209-A4) to Grammar N (209-N4)

In the information processing apparatus of the present disclosure, by using a combination of the acoustic model 208 and one intention model configuring the intention model A (209-A) to the intention model N (209-N), the acoustic model and a group of dictionary and grammar are configured. Accordingly, it is possible to determine the most suitable word group for the input speech signals in the same manner as the process of the matching portion 15 in FIG. 1.

For example, the acoustic score calculation portion 207a of the multi-matching portion 207 calculates the acoustic score for each word configuring a word group, based on the probability (probability of emergence) that a characteristic amount group will be observed from word models included in a word model group configured by the multi-matching portion 207. Moreover, the linguistic score calculation portion 207b of the multi-matching portion 207 calculates the linguistic score for each word configuring a word group, based on the probability that the words included in a word group configured by the multi-matching portion 207 will be catenated (adjacent to each other).

Figure 3:
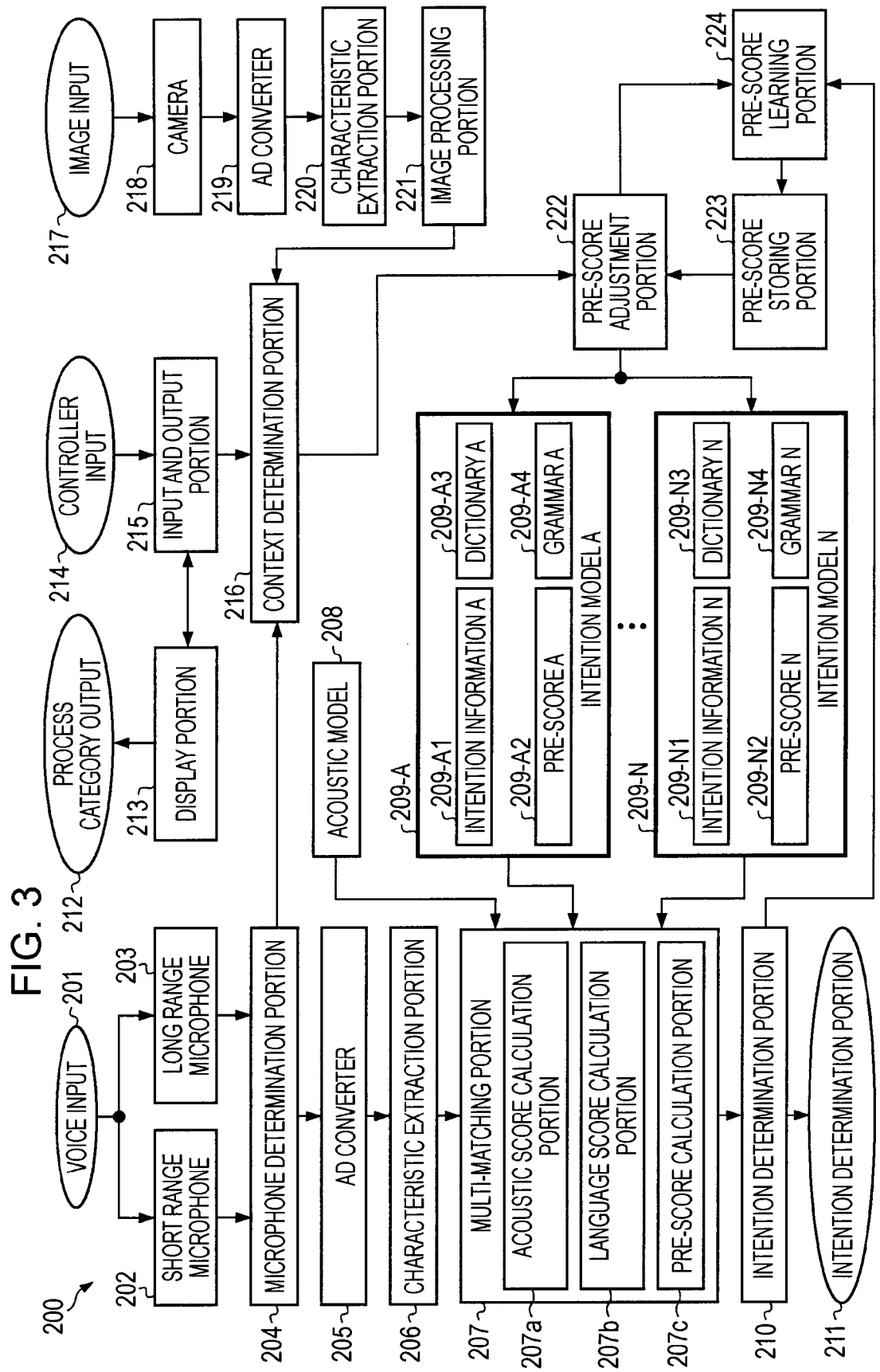
FIG. 3 is a block diagram illustrating a detailed configuration example of the information processing apparatus according to an embodiment of the present disclosure.

Here, while the matching portion 15 in FIG. 1 performs the matching process using a group of dictionary and grammar, the multi-matching portion 207 shown in FIG. 3 performs the matching process using a combination of a plurality of dictionaries and grammars. Consequently, for the combination of respective dictionaries and grammars, that is, for each of the intention models A to N, the most suitable word group for the input speech is determined, and the acoustic score and the linguistic score to be given to the word group are calculated.

Each of the intention models A to N includes the pre-score A (209-A2) to the pre-score N (209-N2). The pre-score is, for example, a score determined in advance based on the occurrence probability of the respective intention.

The pre-score calculation portion 207c of the multi-matching portion 207 calculates the pre-score with respect to the intention information, based on the pre-score A (209-A2) to the pre-score N (209-N2) of the intention models A to N. When all of the intentions occur with equiprobability, the same scores are calculated as the pre-score.

As a result, the multi-matching portion 207 shown in FIG. 3 calculates the following data.

(A) The most suitable word group for input speech calculated using setting information of intention model A, the acoustic score, the linguistic score, and the pre-score (B) The most suitable word group for input speech calculated using setting information of intention model B, the acoustic score, the linguistic score, and the pre-score

...

(N) The most suitable word group for input speech calculated using setting information of intention model N, the acoustic score, the linguistic score, and the pre-score In the multi-matching portion 207 shown in FIG. 3, the data including the most suitable word groups for the N groups of input speech, the acoustic score, the linguistic score, and the pre-score are calculated.

By summing up the acoustic score calculated by the acoustic score calculation portion 207a, the linguistic score calculated by the linguistic score calculation portion 207b, and the pre-score calculated by the pre-score calculation portion 207c, it is possible to calculate a total score with respect to the word group configured for each intention model. The total score is used as a score for estimating the intention corresponding to the user's utterance.

The acoustic score, linguistic score, and pre-score for each intention obtained as the process result of the multi-matching portion 207 are combined with the intention information held by each intention model and transmitted to an intention determination portion 210. In the intention determination portion 210, the total scores calculated by summing up the acoustic score, linguistic score, and pre-score for each intention model are compared, whereby an intention model having the best (highest) score is determined. Subsequently, based on the result, an intention information corresponding to the intention model having the best score is selected as the intention information corresponding to the input speech signals. This intention information is output as a speech comprehension result 211.

Figure 4:
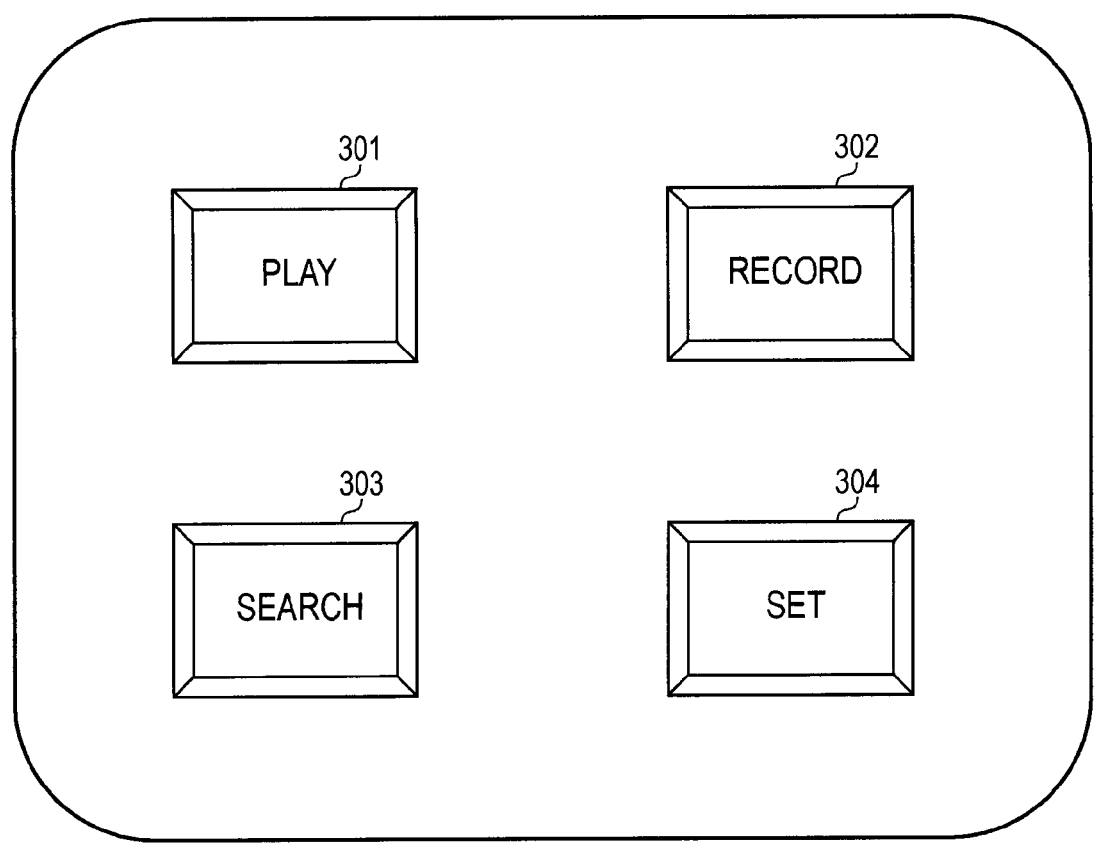
FIG. 4 is a view illustrating an example of category (type) information of a process executed by an information processing apparatus, which is displayed on a display portion.

The display portion 213 outputs and displays category (type) information 212 of the process executed by the information processing apparatus 200 for the user. For example, FIG. 4 illustrates an example of category information of the process executed by the information processing apparatus 200, which is displayed on the display portion 213. In the example shown in FIG. 4, four types of process category information including play 301, record 302, search 303, and set 304 are displayed.

The process category information is a category of process executed by the information processing apparatus, and corresponds to the category of process executed by the information processing apparatus 200 in response to the user's request. For example, when the apparatus executing a process based on speech recognition is a television shown in FIG. 2, in addition to the play 301, record 302, search 303, and set 304 shown in FIG. 4, other process categories such as change of channel, adjustment of volume and the like can also be set.

Hereinafter, in order to simplify description, the process executed by the information processing apparatus 200 will be described based on the four categories including play, record, search, and set information of music data. In this case, as shown in FIG. 4, the four types of process category information including the play 301, record 302, search 303, and set 304 are displayed for the user. The user makes a process request corresponding to any one of these types of process category information.

User makes a specific process request corresponding to any one of the 4 types of process category information including the play 301, record 302, search 303, and set 304, through a microphone, that is, through any one of the short range microphone 202 and long range microphone 203 shown in FIG. 3.

For example, the user speaks words such as "play", "fast forward", and "rewind" as the instruction corresponding to the process category of the play 301, thereby causing the information processing apparatus 200 to execute the process in response to these instructions.

As shown in FIG. 5, the intention information corresponding to the four types of process categories including play, record, search, and set has been registered in advance in the memory in the information processing apparatus.

For example, in the process category of play, 5 types of intention information including "play", "fast forward", "rewind", "move to next music", and "move back to previous music" are defined.

Likewise, in the process category of record, 4 types of intention information: "start recording", "stop recording", "resume recording", and "save data" are set; in the process category of search, 3 types of intention information: "search by name", "search by genre", and "search by player" are set; and in the process category of set, 3 types of intention information: "set name", "set genre", and "set player" are set.

In this manner, one or more pieces of intention information are set in advance with respect to each process category and recorded in the memory in the information processing apparatus.

The total amount of the intention information shown in FIG. 5 is 15. In this case, for N of the intention models 209A to N shown in FIG. 3, 15 intention models are set, and as the intention information A to N set for the intention models 209A to N shown in FIG. 3, 15 intention models A to N including the following information are set.

Intention information A=[Play]
Intention information B=[fast forward]
. . .
Intention information N=[Set player]

The N of intention models 209A to N shown in FIG. 3 output the pre-scores A to N corresponding to each intention information to the multi-matching portion 207.

Figure 6:
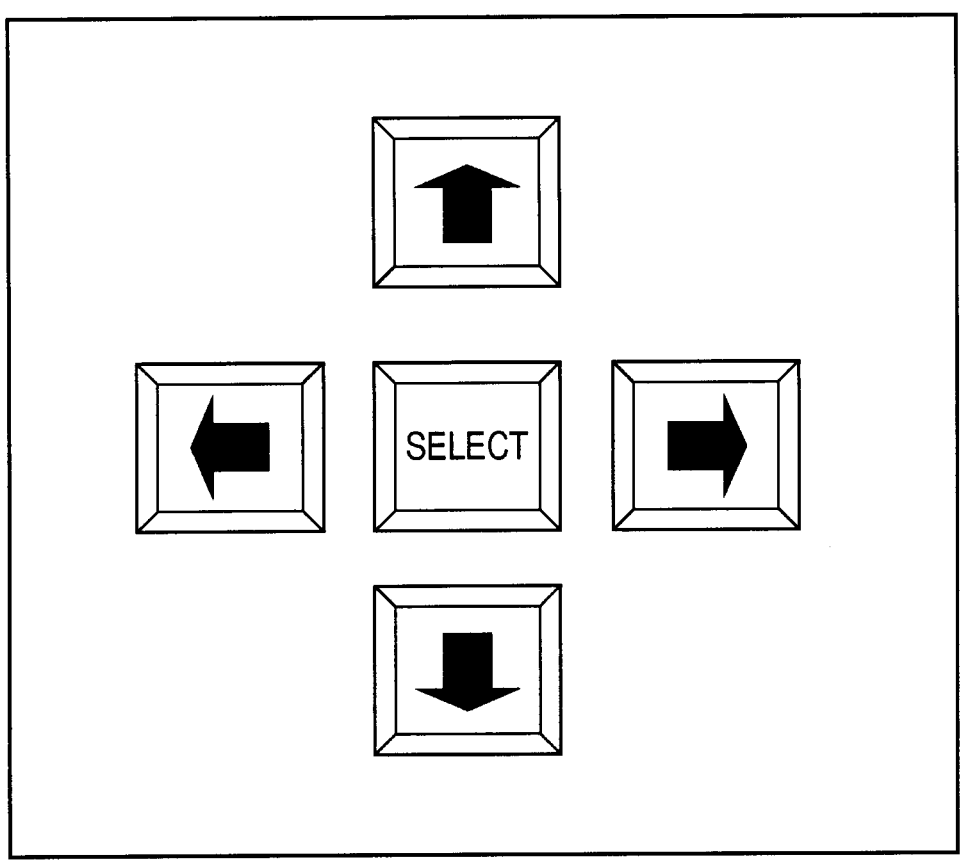
FIG. 6 is a view illustrating an example of selecting a process category using a controller of the information processing apparatus according to an embodiment of the present disclosure.

While seeing the displayed process category information shown in FIG. 4, the user can select one of the process category information (play 301, record 302, search 303, and set 304) shown in FIG. 4, by using, for example, a controller configured with five buttons including four direction buttons and one select button shown in FIG. 6.

A controller input 214 shown in FIG. 3 corresponds to the information selected from the process category by the user, and the result of the selection performed by the user is input in the context determination portion 216 through an input and output portion 215. The input and output portion 215 outputs the process category information to be displayed for the user to the display portion 213 and outputs the process category information selected by the user which is input from the input and output portion 215 to the context determination portion 216.

In the context determination portion 216, the context information for estimating the user's intention is input.

The context information is observation information applied to the estimation of the user's intention and specifically includes the following information.

(A) [process category information selected by a user] input from the input and output portion 215

(B) [information of speech input person identification] input from an image processing portion 221

(C) [information of speech input microphone identification] input from the microphone determination portion 204

In the following description, a process example will be described in which all of these 3 types of context information are used. However, it is not necessary that all of these 3 types of context information are used, and for example, a configuration may be used in which 1 or 2 pieces of information are used among the 3 types of context information.

In the context determination portion 216, respective information including [information of speech input person identification] from the image processing portion 221 and [information of speech input microphone identification] from the microphone determination portion 204 are input as the context information for estimating the user's intention, in addition to the [process category information selected by a user] as the information selected by the user input from the input and output portion 215 described above.

The [information of speech input person identification] will be described which is input in the context determination portion 216 from the image processing portion 221 as the result of image processing.

First, the image of the user taken by a camera 218 used as an imaging device such as a CCD camera is input as an image input 217 which is an image signal. The image signal is converted into a digital signal in an AD converter 219 and then transmitted to a characteristic extraction portion 220. In the characteristic extraction portion 220, the transmitted image data is subjected to face detection and extraction of characteristic amount from the detected face image. Herein, the face detection corresponds to a process of extracting a facial region (the position and size of a face) from the image data, and a portion corresponding to the extracted facial region is called facial image.

The facial image is subjected to detection of parts such as the eyes, nose, and mouth representing the character of the face and detection of the orientation of face, and then a process such as an affine conversion or the like is performed to locate the respective parts of the face at a standard position. Thereafter, by using a plurality of filters having orientation selectivity and different frequency components, which is called Gabor filter, the characteristic amount of the facial image is extracted as a vector. The characteristic amount is transmitted to the image processing portion 221.

In the image processing portion 221, a process of face identification is performed based on the transmitted characteristic amount. Herein, the face identification corresponds to a process in which the facial image extracted by the face detection is used to identify to which person the image belongs among persons whose facial images have already been registered. To the face identification, for example, an identification technique called Support Vector Machine or Adaboost is applied.

The Support Vector Machine is an identification technique features constructing a hyperplane separating a characteristic amount vector extracted from the facial image of the specific same person and a characteristic amount vector extracted from a facial image of a person other than the same person, in a characteristic space obtained after mapping, by using nonlinear mapping in which a kernel function is used.

The Adaboost is a technique of configuring a strong identification device by combining a plurality of weak identification devices. For any of the identification devices, a method is used in which the identification device is configured in advance by using a characteristic amount vector extracted from a facial image of the specific same person registered in advance and a characteristic amount vector extracted from a registered facial image of a person other than the same person.

Using the identification device for face identification, the image processing portion 221 determines a person corresponding to the facial image included in the image signal input from the camera 218. Thereafter, the determination result is transmitted to the context determination portion 216 as the [information of speech input person identification].

In the context determination portion 216, the [information of speech input microphone identification] from the microphone determination portion 204 is input as the context information.

The microphone determination portion 204 outputs the [information of speech input microphone identification] showing from which microphone between the short range microphone 202 and the long range microphone 203 the speech signal has been input, to the context determination portion 216, as the context information.

In this manner, in the context determination portion 216, the context information including the following information is input.

(A) [process category information selected by a user] input from the input and output portion 215

(B) [information of speech input person identification] input from the image processing portion 221

(C) [information of speech input microphone identification] input from the microphone determination portion 204

In order to calculate and adjust the pre-scores A to N (209-A2 to 209-N2) set for each of the intention models A to N (209-A to N) shown in FIG. 3 based on the above information, the context determination portion 216 outputs the input context information to a pre-score adjustment portion 222.

Based on the context information input from the context determination portion 216, a pre-score storing portion 223 calculates the pre-scores A to N (209-A2 to 209-N2) and provides the calculated value to the intention models A to N (209-A to N). Based on the context information input from the context determination portion 216, the pre-score storing portion 223 calculates the pre-scores A to N (209-A2 to N2) according to an algorithm prescribed in advance.

Figure 7:
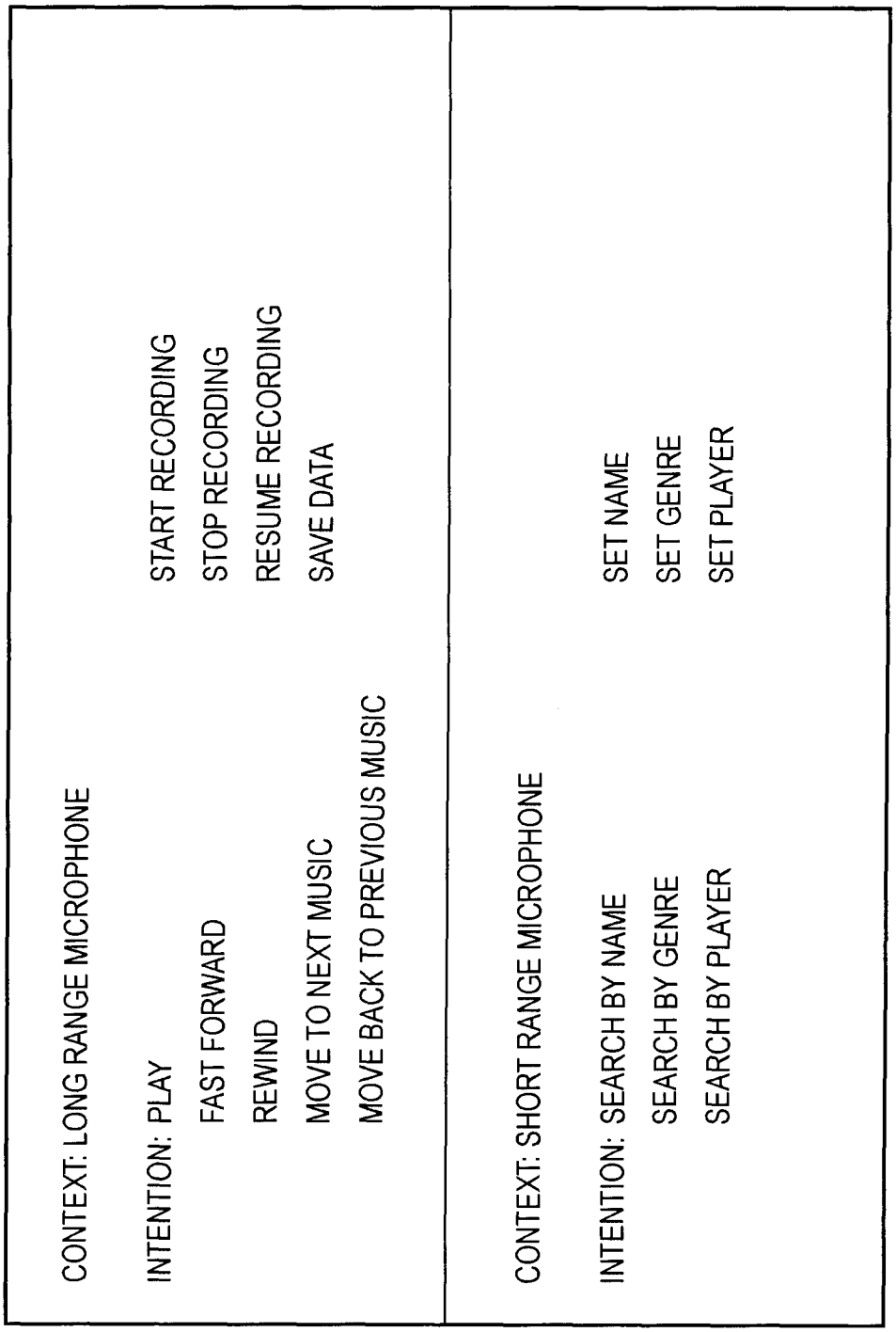
FIG. 7 is a view illustrating an example of data registered in a pre-score storing portion of the information processing apparatus according to an embodiment of the present disclosure.
Figure 8:
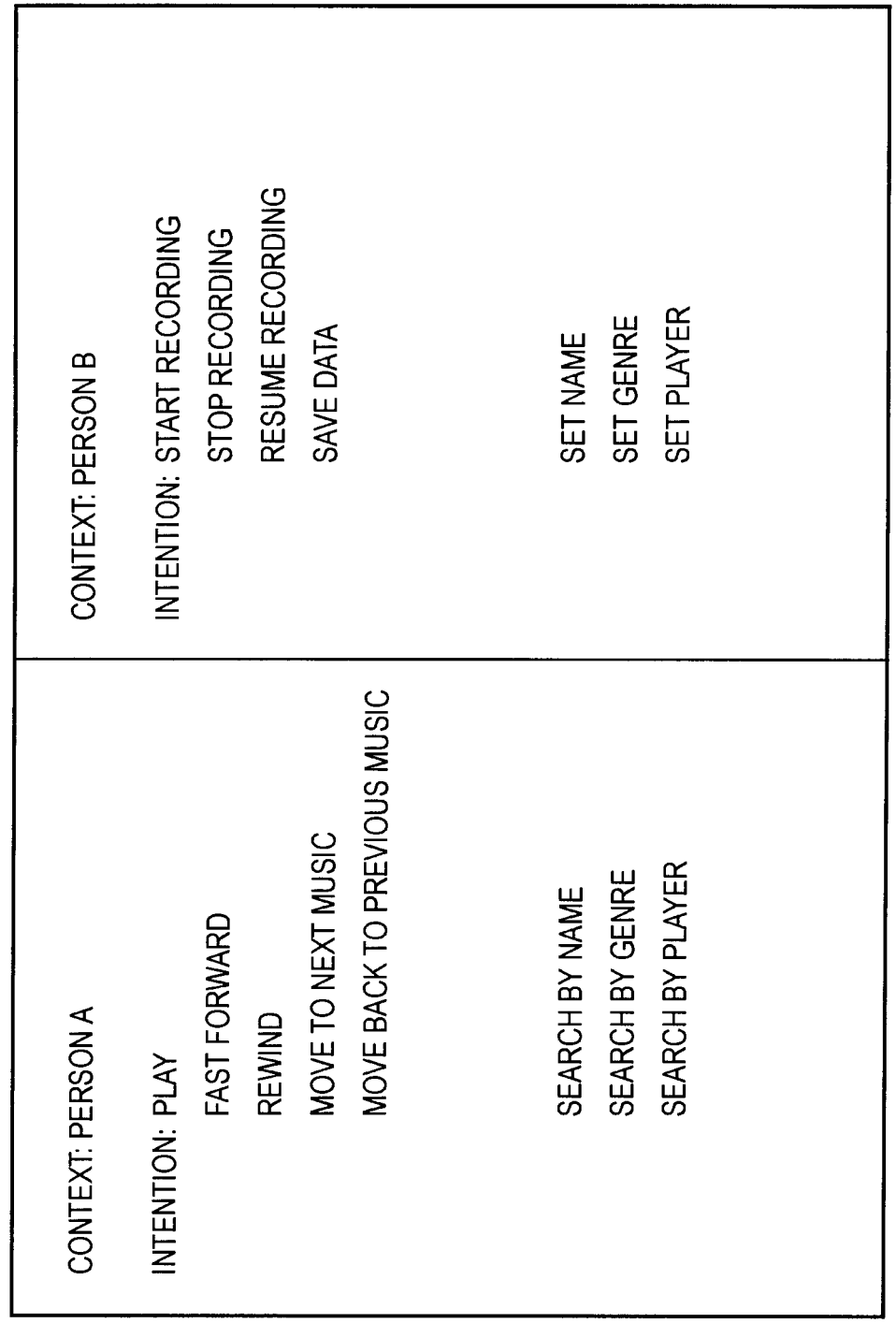
FIG. 8 is a view illustrating an example of data registered in a pre-score storing portion of the information processing apparatus according to an embodiment of the present disclosure.

The pre-score storing portion 223 stores the context information shown in FIGS. 5, 7, and 8 and combination data of the intention information corresponding to the context information.

FIG. 5 illustrates the [process category information selected by a user] (=context information) which has been transmitted to the context determination portion 216 through the input and output portion 215 and classified into 4 types, that is, the four types of context information including [play], [record], [search], and [set], and the intention information corresponding to each of the context information, as described above.

FIG. 7 illustrates the [information of speech input microphone identification] (=context information) transmitted from the microphone determination portion 204 and the intention information corresponding to each of the [information of speech input microphone identification]. That is, FIG. 7 illustrates 2 types of the context information including the [long range microphone] and the [short range microphone], and the intention information corresponding to each of the context information.

FIG. 8 illustrates the [information of speech input microphone identification] (=context information) transmitted from the image processing portion 221 and the intention information corresponding to each of the [information of speech input microphone identification]. That is, FIG. 8 illustrates 2 types of context information including a [person A] and a [person B] and the intention information corresponding to each of the context information.

In the present example, 2 persons including the [person A] and [person B] are set. However, the number of person can be arbitrarily set according to the amount of personal information that has been registered in the information processing apparatus in advance.

In FIGS. 5, 7, and 8, only the combination of each of the context information and the intention information corresponding to the context is shown. However, as the pre-score, a high value (for example, 1.0) is set for the intention information corresponding to each of the context information, and a low value (for example, 0.0) is set for the intention information not corresponding to the context information.

Specifically, for example, in the example shown in FIG. 5, 5 types of intention information including [play] to [move back to previous music] are registered as the intention information corresponding to a context [play]. In this case, the pre-score (pre-score corresponding to a context) with respect to the context [play] is set to a high value for the 5 types of intention information including the intention information: [play] to [move back to previous music], and the pre-score for other types of intention information including [start recording] to [set player] is set to a low value.

FIGS. 9 to 11 show examples of setting of the pre-scores stored in pre-score storing portion 223.

The scores are the [pre-score corresponding to a context] set is association with each of the individual contexts.

That is, FIG. 9 is an example of setting of the [pre-score corresponding to a context] with respect to the (A) [process category information selected by user] which is the context information input from the input and output portion 215.

FIG. 10 is an example of setting of the [pre-score corresponding to a context] with respect to the (B) [information of speech input person identification] which is the context information input from the image processing portion 221.

FIG. 11 is an example of setting of the [pre-score corresponding to a context] with respect to the (C) [information of speech input microphone identification] which is the context information input from the microphone determination portion 204.

FIG. 9 is an example of setting of the [pre-score corresponding to a context] with respect to the (A) [process category information selected by user] which is the context information input from the input and output portion 215.

For example, when the context information in which the user has selected the [play] as the process category is input in the pre-score adjustment portion 222 through the input and output portion 215 and the context determination portion 216, 15 pre-scores corresponding to the context including [play]= 0.9 to [set player]=0.01 set for the entries of the column under an entry [play] shown in FIG. 9 are selected as the pre-score corresponding to a context which corresponds to each intention, and the pre-scores are used later for the next process.

As shown from the pre-score corresponding to a context shown in FIG. 9, the pre-score selected when the user selects [play] as the process category is high with respect to the intention corresponding to the play process. For other intentions (start recording to set player) which do not correspond to the play process, a low score is set.

In addition, regarding the intention corresponding to each process category, the data described above with reference to FIG. 5 is stored in pre-score storing portion 223.

For example, when the user selects [record] as the process category, 15 pre-scores corresponding to the context including [play]=0.2 to [set player]=0.02 set for the entries of the column under an entry [record] shown in FIG. 9 are selected as the pre-score corresponding to a context which corresponds to each intention and used later for the next process.

When the user selects [search] as the process category, 15 pre-scores corresponding to the context including [play]=0.2 to [set player]=0.3 set for the entries of the column under an entry [search] shown in FIG. 9 are selected as the pre-score corresponding to a context which corresponds to each intention and used later for the next process.

When the user selects [set] as the process category, 15 pre-scores corresponding to the context including [play]=0.1 to [set player]=0.8 set for the entries of the column under an entry [set] shown in FIG. 9 are selected as the pre-score corresponding to a context which corresponds to each intention and used later for the next process.

The [pre-score corresponding to a context] shown in FIG. 9 can also be set by setting fixed values in advance and using the fixed values continuously. However, after initial values are set, the information processing apparatus may learn actual processes performed thereafter by the user and update data based on the learning data.

For example, if the user frequently makes the process request of [rewind] as the process to be executed after selecting [play] as the process category, the information processing apparatus performs update to gradually heighten the pre-score corresponding to [play] of the intention=[rewind].

This process is performed as the process of a pre-score learning portion 224 shown in FIG. 3.

FIG. 10 is an example of setting of the [pre-score corresponding to a context] with respect to the (B) [information of speech input person identification] which is the context information input from the image processing portion 221.

[person A] and [person B] have already been registered as the speech input persons, and the pre-score corresponding to these persons has been set.

For example, in the image processing portion 221 shown in FIG. 3, when the speech input person is identified to be [person A], and the context information showing that the [person A] is the speech input person is input in the pre-score adjustment portion 222 through the image processing portion 221 and the context determination portion 216, 15 pre-scores corresponding to the context including [play]=0.9 to [set player]=0.1 set for the entries of the column under an entry [person A] shown in FIG. 10 are selected as the pre-score corresponding to a context which corresponds to each intention and used later for the next process.

The pre-score corresponding to a context set for the entries of the column under the entry [person A] shown in FIG. 10 is the data registered in advance based on the information showing that [person A] frequently executes the play process but rarely executes the recording process.

On the other hand, when the speech input person is identified to be [person B], 15 pre-scores corresponding to the context including [play]=0.3 to [set player]=0.9 set for the entries of the column under an entry [person B] shown in FIG. 10 are selected as the pre-score corresponding to a context which corresponds to each intention and used later for the next process.

These scores are data registered in advance based on the information showing that [person B] rarely executes the play process but frequently executes the recording process.

The pre-score may be freely set in advance or may be subjected to score update in which a proper initial value is set, and then the learning process is executed based on the actual process executed by each person in the information processing apparatus to give a high score to the frequently executed process and to give a low score to the rarely executed process.

This learning process is executed as a process of the pre-score learning portion 224 shown in FIG. 3.

FIG. 11 is an example of the setting of [pre-score corresponding to a context] with respect to (C) [information of speech input microphone identification] which is the context information input from the microphone determination portion 204.

For example, in the microphone determination portion 204 shown in FIG. 3, when the speech input microphone is identified to be [long range microphone], and the context information showing that the speech input microphone is the [long range microphone] is input in the pre-score adjustment portion 222 through the microphone determination portion 204 and the context determination portion 216, 15 pre-scores corresponding to the context including [play]=0.9 to [set player]=0.1 set for the entries of the column under an entry [long range microphone] shown in FIG. 11 are selected as the pre-score corresponding to a context which corresponds to each intention and used later for the next process.

The pre-score corresponding to a context set for the entries of the column under the entry [long range microphone] shown in FIG. 11 is the data registered in advance based on the information showing that the play process is frequently executed, but the search process is rarely executed by the instruction input through [long range microphone].

On the other hand, when the speech input microphone is identified to be [short range microphone], 15 pre-scores corresponding to the context including [play]=0.1 to [set player] =0.9 set for the entries of the column under an entry [short range microphone] shown in FIG. 11 are selected as the pre-score corresponding to a context which corresponds to each intention and used later for the next process.

These scores are data registered in advance based on the information showing that the play process is rarely executed, but the search process is frequently executed by the instruction input through the [short range microphone].

The pre-score may be freely set in advance or may be subjected to score update in which a proper initial value is set, and then the learning process of analyzing an actual application process of each microphone is executed in the information processing apparatus to give a high score to the frequently executed process and to give a low score to the rarely executed process for each microphone as a unit.

This process is executed as the process of the pre-score learning portion 224 shown in FIG. 3.

In this manner, the pre-score adjustment portion 222 performs the process of adjusting the pre-score value set for the pre-scores A to N (209-A2 to 209-N2) of the intention models A to N, 209-A to N, based on the context information transmitted from the context determination portion 216, with reference to the registered information (FIGS. 9 to 11) in the pre-score storing portion 223.

There are three types of context information as follows which are transmitted from the context determination portion 216 to the pre-score adjustment portion 222.

(A) [process category information selected by a user] input from the input and output portion 215

(B) [information of speech input person identification] input from an image processing portion 221

(C) [information of speech input microphone identification] input from the microphone determination portion 204

Based on each of the 3 types of context information, the pre-score adjustment portion 222 calculates [total pre-score] as a result calculated by taking all of the [pre-score corresponding to a context], which is the pre-score corresponding to each context shown in FIGS. 9 to 11, into consideration, and sets the [total pre-score] as the pre-scores A to N (209-A2 to N2) of the intention models A to N (209-A to N) shown in FIG. 3.

For example, when the context information of [short range microphone] is transmitted based on the process result of the microphone determination portion 204, [total pre-score] is calculated by applying the pre-score corresponding to a context set for an entry [short range microphone], which is the pre-score corresponding to a context shown in FIG. 11, and then the [total pre-score] is set as the pre-scores A to N (209-A2 to N2) of the intention models A to N (209-A to N) shown in FIG. 3.

Furthermore, when the context information of [long range microphone] is transmitted, [total pre-score] is calculated by applying the value of the pre-score corresponding to a context set for the entry [long range microphone], which is the pre-score corresponding to a context shown in FIG. 11, and then the [total pre-score] is set as the pre-scores A to N (209-A2 to N2) of the intention models A to N (209-A to N) shown in FIG. 3.

Taking the short range microphone and the long range microphone as the context information is effective when things that can be instructed by the user are restricted depending on the distance between the user and the microphone. For example, a case is assumed in which the long range microphone only deals with the instruction restricted to daily usage, and the short range microphone deals with the instruction which is more freely provided. In general, the longer the distance between the user and the microphone, the worse the performance of estimating the intention from a speech. Consequently, restricting the things that can be instructed by the user plays an important role to improve the performance of intention estimation for the long range microphone.

In the similar manner, when the context information of [play] is transmitted based on the process result of the input and output portion 215, [total pre-score] is calculated by applying the pre-score corresponding to a context set for an entry [play], which is the pre-score corresponding to a context shown in FIG. 9, and then the [total pre-score] is set as the pre-scores A to N (209-A2 to N2) of the intention models A to N (209-A to N) shown in FIG. 3.

In general, the larger the total amount of the intention information to be handled, the worse the performance of estimating the intention from a speech. Consequently, restricting the things that can be instructed by the user according to the designation made by the user plays an important role to improve the performance of intention estimation.

When the context information of [person A] is transmitted based on the process result of the image processing portion 221, [total pre-score] is calculated by applying the pre-score corresponding to a context set for the entry [person A], which is the pre-score corresponding to a context shown in FIG. 10, and then the [total pre-score] is set as the pre-scores A to N (209-A2 to N2) of the intention models A to N (209-A to N) shown in FIG. 3.

This process plays a role of giving a high score to the intention information which is used by each person in a high frequency, by using a property that some functions are frequently used while some other functions are rarely used depending on a person using the system.

When a combination of the intention information corresponding to the context information can be determined in advance, it is possible to give a low pre-score to the intention information that does not correspond to the context information. Particularly, when the pre-score is set to 0.0, it is not necessary to calculate the acoustic score and the linguistic score with respect to the intention model corresponding to the intention information, so the calculation amount can be effectively reduced.

Based on the following 3 types of context information input from the context determination portion 216, that is, based on (A) [process category information selected by a user] input from the input and output portion 215

(B) [information of speech input person identification] input from an image processing portion 221

(C) [information of speech input microphone identification] input from the microphone determination portion 204, the pre-score adjustment portion 222 selects [pre-score corresponding to a context] which is the pre-score corresponding to each context shown in FIGS. 9 to 11, calculates [total pre-score] by applying the selected [pre-score corresponding to a context], and sets the calculated [total pre-score] as the pre-scores A to N (209-A2 to N2) of the intention models A to N (209-A to N) shown in FIG. 3.

The detailed example of this process will be described as follows.

First, a basic process example of the intention estimation process based on the speech comprehension will be described.

The following formula (1) is a formula for calculating an occurrence probability of an intention: P(S|X) used for estimating intention in the speech comprehension.

$$P(S|X) = \frac{P(X|S)P(S)}{P(X)} \qquad \text{Formula (1)}$$

In the above Formula (1), X represents an input speech signal, S represents intention, and P(S|X) represents a probability that an input signal (X) will be obtained when there is intention (S).

The occurrence probability of an intention: P(S|X) calculated by Formula (1) represents a probability that when the input speech signal [X] is detected, the intention of the signal will be [S].

The speech comprehension is formulated to determine the intention S having the maximum occurrence probability, based on Formula (1).

For example, when the 15 types of intention including [play] to [set player] shown in FIG. 5 and FIGS. 9 to 11 have been registered, each of the 15 types of intention information is set so as to be S1=[play]
S2=[fast forward]
...
S15=[set player].

The occurrence probability: P(S1|X) to P(S15|X) is calculated for the intention information: S1 to S15, and the intentions (S1 to S15) having the maximum value among the calculated 15 occurrence probabilities are selected. The selected intentions are determined to be the user's intentions. This is a basic process of the intention estimation.

In the information processing apparatus according to the present disclosure shown in FIG. 3, the multi-matching portion 207 and the intention determination portion 210 shown in FIG. 3 use Formula (1) which is a basic formula of the intention estimation based on the speech comprehension by modifying the formula to the following Formula (2).

$$P(S\mid X) = \frac{P(X\mid w_{s1}, w_{s2}, \ldots, w_{sn})^a P(w_{s1}, w_{s2}, \ldots, w_{sn}\mid S)^b P(S)^c}{\sum_S P(X\mid w_{s1}, w_{s2}, \ldots, w_{sn})^a P(w_{s1}, w_{s2}, \ldots, w_{sn}\mid S)^b P(S)^c} \quad \text{Formula (2)}$$

In the above Formula (2), $w_{s1}$ (i=1, ... N) represents words defined with respect to the intention S. That is, based on a word group $w_{s1}, w_{s2}, \ldots, w_{sn}$ configured with words defined with respect to the intention S, the acoustic score is calculated.

This score corresponds to the probability $P(X\mid w_{s1}, w_{s2}, \ldots, w_{sn})$.

In addition, the linguistic score calculated with respect to a specific intention S corresponds to the probability $P(w_{s1}, w_{s2}, \ldots, w_{sn}\mid S)$.

Moreover, the occurrence probability (pre-probability) P(S) to be given to a specific intention S corresponds to the pre-score (209 A2 to N2) set in each of the intention models A to N (209-A to N).

a, b, and c respectively represent the weight of the acoustic score, linguistic score, and the pre-score calculated for each intention model in the speech comprehension. Pre-set values are used as the a, b, and c.

As described above, the multi-matching portion 207 shown in FIG. 3 calculates the following data.

(A) The most suitable word group for input speech calculated using setting information of intention model A, the acoustic score, the linguistic score, and the pre-score (B) The most suitable word group for input speech calculated using setting information of intention model B, the acoustic score, the linguistic score, and the pre-score

...

(N) The most suitable word group for input speech calculated using setting information of intention model N, the acoustic score, the linguistic score, and the pre-score In the multi-matching portion 207 shown in FIG. 3, the data including the most suitable word group for the N groups of input speech, the acoustic score, the linguistic score, and the pre-score is calculated.

The word group corresponding to each intention model corresponds to the word group $w_{si}$ (i=1, ... N) shown in Formula (2), that is, $w_{s1}, w_{s2}, \ldots, w_{sn}$.

The acoustic score corresponds to the probability $P(X\mid w_{s1}, w_{s2}, \ldots, w_{sn})$ shown in Formula (2).

The linguistic score corresponds to the probability $P(w_{s1}, w_{s2}, \ldots, w_{sn}\mid S)$ shown in Formula (2).

The pre-score (209 A2 to N2) used as the occurrence probability (pre-probability) P(S) is [total pre-score] calculated by applying [pre-score corresponding to a context] extracted from each context shown in FIGS. 9 to 11, based on each of the following 3 types of context information, as described above.

(A) [process category information selected by a user] input from the input and output portion 215

(B) [information of speech input person identification] input from the image processing portion 221

(C) [information of speech input microphone identification] input from the microphone determination portion 204

The acoustic score, linguistic score, and pre-score for each intention obtained as the process results of the multi-matching portion 207 are combined with the intention information held by each intention model and then transmitted to the intention determination portion 210.

The intention determination portion 210 compares the total scores calculated by summing up the acoustic score, linguistic score, and pre-score with respect to each intention model, thereby determining an intention model having the best (highest) score.

Specifically, this determination process is executed as a comparison process of the occurrence probability: P(S|X) of each intention of Formula (2). The intention for which the highest occurrence probability: P(S|X) is calculated, that is, any one of the intention A to N is determined as the speech comprehension result 211 corresponding to the user's utterance.

In the information processing apparatus 200 of the present disclosure, the value of the occurrence probability (pre-probability) P(S) used in the above Formula (2), that is, the value of the pre-score P(S) is not fixed all the time but appropriately adjusted according to the context. This adjustment process makes it possible to improve the performance of the intention estimation. In addition, regarding the intention information of the pre-score P(S)=0.0, the following calculations can be omitted.

Acoustic score: $P(X\mid w_{s1}, w_{s2}, \ldots, w_{sn})$
Linguistic score: $P(w_{s1}, w_{s2}, \ldots, w_{sn}\mid S)$ A method of calculating the pre-score P(S) applied in the information processing apparatus of the present disclosure will be described.

The P(S) included in Formula (2) is the occurrence probability (pre-probability) P(S) to be given to a specific intention S and corresponds to the value of the pre-score.

In the information processing apparatus of the present disclosure, the pre-score P(S) is taken as the total pre-score P(S) as a result obtained by taking all of the following 3 types of context information into consideration. That is, [total pre-score] is calculated and used which is a result obtained by taking all of the [pre-score corresponding to a context] into consideration. The [pre-score corresponding to a context] is the pre-score corresponding to each context, which is calculated based on each of the following 3 types of context information.

(A) [process category information selected by a user] input from the input and output portion 215

(B) [information of speech input person identification] input from the image processing portion 221

(C) [information of speech input microphone identification] input from the microphone determination portion 204

The formula for calculating the total pre-score: P(S) is shown as the following Formula (3).

$$P(S)==P(C_1)P(S|C_1)+P(C_2)P(S|C_2)+ \ldots +P(C_K)P(S|C_K) \quad \text{Formula (3)}$$

In Formula (3), K represents the amount of the context information transmitted from the context determination portion 216.

In the example shown in FIG. 2, the following 3 types of context information are input to the context determination portion 216.

(A) [process category information selected by a user] input from the input and output portion 215

(B) [information of speech input person identification] input from the image processing portion 221

(C) [information of speech input microphone identification] input from the microphone determination portion 204

Accordingly, K=3.

In addition, $C_k$ represents each context information.

$C_1$ represents the context information transmitted from the microphone determination portion 204, $C_2$ represents the context information transmitted from the input and output portion 215, and $C_3$ represents the context information transmitted from the image processing portion 221.

$P(S|C_K)$ at the right end represents the probability that the intention: S will occur when a certain type of context information: $C_K$ is detected, and corresponds to the values in the tables described with reference to FIGS. 9 to 11, that is, the [pre-score corresponding to a context] stored in the pre-score storing portion 223.

In addition, $P(C_K)$ represents the weight of $P(S|C_K)$. A pre-set value is used as the weight.

For example, when the intention S represents [play], and the context information $C_1$ transmitted from the microphone determination portion 204 represents the [long range microphone], the pre-score: $P(S|C_1)=0.9$, as shown in FIG. 11.

For example, when the intention S represents [fast forward], and the context information $C_1$ represents the [short range microphone], the pre-score: $P(S|C_1)=0.1$, as shown in FIG. 11.

A specific example of calculating the [total pre-score] based on Formula (3) will be described. For example, the weight corresponding to each [pre-score corresponding to a context] is set so as to be $P(C_1)=0.5$, $P(C_2)=0.6$, and $P(C_3)=0.4$.

Herein,

[information of speech input microphone identification] transmitted from the microphone determination portion 204, that is, the context information $C_1$ is [short range microphone],

[process category information selected by a user] transmitted from the input and output portion 215, that is, the context information $C_2$ is [play], and

[information of speech input person identification] transmitted from the image processing portion 221, that is, the context information $C_3$ is [person B].

At this time, regarding the intention S [play], the values such as $P(S|C_1)=0.1$, $P(S|C_2)=0.9$, and $P(S|C_3)=0.3$ are obtained by the pre-score storing portion 223 from the set value of [pre-score corresponding to a context] shown in FIGS. 9 to 11.

Next, each [pre-score corresponding to a context] and weight are calculated by using Formula (3), and the result of this calculation is summed up to calculate a final [total pre-score P(S)] in which all of the context information has been considered.

That is, according to a formula, total pre-score: $P(S)=0.5 \times 0.1+0.6 \times 0.9+0.4 \times 0.3=0.71$, a final [total pre-score] P(S) in which all of the context information has been considered is calculated.

For example, when the intention information A of the intention model A (209-A) shown in FIG. 3=[play], as the pre-score A (209-A2) of the intention model A (209-A), the total pre-score obtained as the result of the above calculation, that is, Total pre-score: $P(S)=0.5 \times 0.1+0.6 \times 0.9+0.4 \times 0.3=0.71$ is calculated in the pre-score adjustment portion 222 and set.

In the pre-score adjustment portion 222, regarding all of the intention information ([play] to [set player]), the set value of [pre-score corresponding to a context] shown in FIGS. 9 to 11 is selected, and the total pre-score: P(S) is calculated, based on the following 3 types of context information.

(A) [process category information selected by a user] input from the input and output portion 215

(B) [information of speech input person identification] input from an image processing portion 221

(C) [information of speech input microphone identification] input from the microphone determination portion 204

The pre-score adjustment portion 222 sets the total pre-score which is the calculated value, as the pre-scores A to N (209-A2 to N2) of each of the intention models A to N (209-A to N).

In this manner, for the pre-scores A to N (209-A2 to N2) of each of the intention models A to N (209-A to N), the [total pre-score] calculated using [pre-score corresponding to a context] shown in FIGS. 9 to 11 is set.

As described above, in the information processing apparatus according to the present disclosure shown in FIG. 3, the multi-matching portion 207 shown in FIG. 3 calculates the following data.

(A) The most suitable word for input speech calculated using setting information of intention model A, the acoustic score, the linguistic score, and the pre-score (B) The most suitable word group for input speech calculated using setting information of intention model B, the acoustic score, the linguistic score, and the pre-score

. . .

(N) The most suitable word group for input speech calculated using setting information of intention model N, the acoustic score, the linguistic score, and the pre-score That is, the multi-matching portion 207 shown in FIG. 3 calculates the data including the most suitable word group for the N group of input speech, the acoustic score, and the linguistic score.

The word group corresponding to each intention model corresponds to a word group $w_{si}$ (i=1, . . . N) shown in Formula (2), that is, $w_{s1}, w_{s2}, \ldots, w_{sn}$.

The acoustic score corresponds to the probability $P(X|w_{s1}, w_{s2} \ldots, w_{sn})$ shown in Formula (2).

The linguistic score corresponds to the probability $P(w_{s1}, w_{s2} \ldots, w_{sn}|S)$ shown in Formula (2).

As described above, the pre-score (209 A2 to N2) used as the occurrence probability (pre-probability) P(S) is the [total pre-score] calculated by applying [pre-score corresponding to a context] extracted from each context shown in FIGS. 9 to 11, based on each of the following 3 types of context information.

(A) [process category information selected by a user] input from the input and output portion 215

(B) [information of speech input person identification] input from an image processing portion 221

(C) [information of speech input microphone identification] input from the microphone determination portion 204

The acoustic score, linguistic score, and pre-score of each intention obtained as the process result of the multi-matching portion 207 are combined with the intention information held by each intention model and then transmitted to the intention determination portion 210.

By comparing the total scores calculated by summing up the acoustic score, linguistic score, and the pre-score with respect to each intention model, the intention determination portion 210 determines an intention model having the best (highest) score.

This determination process is performed as a process of comparing the occurrence probability: P(S|X) of each intention of the Formula (2). An intention for which the highest occurrence probability: P(S|X) is calculated, that is, any one of the intentions A to N is determined to be the speech comprehension result 211 corresponding to the user's utterance.

The weight: $P(C_k)$ and [pre-score corresponding to a context]: $P(S|C_k)$ shown in Formula (3) are stored in the pre-score storing portion 223, and the values thereof are set in advance. As the value set in advance, a predetermined fixed value may be used, or the value may be dynamically set by the pre-score learning portion 224 which will be described as follows.

Next, the process of the pre-score learning portion 224 will be described. As shown in FIG. 3, the intention information S determined by the intention determination portion 210 is not only output as the speech comprehension result 211 but fed back to the pre-score learning portion 224. All of the context information $C_k$ transmitted from the context determination portion 216 is transmitted to the pre-score learning portion 224 from the pre-score adjustment portion 222.

In the pre-score learning portion 224, based on the context information $C_k$ transmitted from the pre-score storing portion 223 and the intention information S as the speech comprehension result transmitted from the intention determination portion 210, $P(S|C_k)$ is calculated and transmitted to the pre-score adjustment portion 222. This value (the value shown in FIGS. 9 to 11) is stored in the pre-score storing portion 223.

$P(S|C_k)$ can be determined as a value of a conditional probability $P(S|C_k)$ that the intention information S will be observed from the context information $C_k$. For the intention information output from the intention determination portion 210, a case is assumed in which a determination error is included. Herein, when the user modifies the output result, by transmitting the modified information to the pre-score learning portion 224, it is possible to more accurately determine the conditional probability $P(S|C_k)$.

[3. The Example of the Hardware Configuration of the Information Processing Apparatus]

Figure 12:
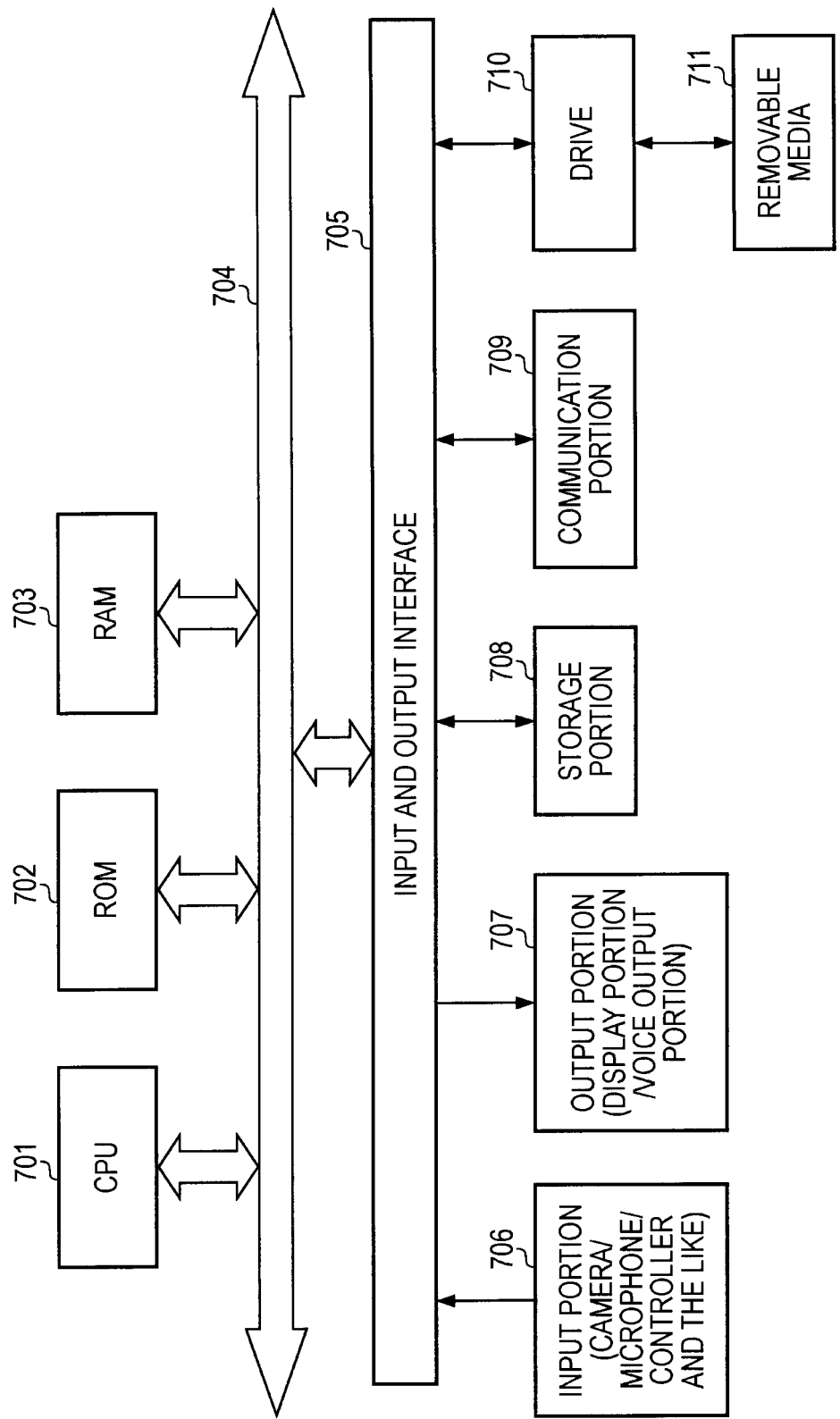
FIG. 12 is a view illustrating an example of a hardware configuration of the information processing apparatus according to an embodiment of the present disclosure.

Finally, an example of the hardware configuration of the information processing apparatus executing the process described above will be described with reference to FIG. 12. A CPU (Central Processing Unit) 701 executes various processes according to programs storing in a ROM (Read Only Memory) 702 or a storage portion 708.

A RAM (Random Access Memory) 703 appropriately stores the programs executed by the CPU 701 and data. The CPU 701, ROM 702, and the RAM 703 are connected to each other by a bus 704.

The CPU 701 is connected to an input and output interface 705 through the bus 704, and the input and output interface 705 is connected to an input portion 706 configured with a camera, a microphone, a controller, a remote control, a keyboard, a mouse and the like and to an output portion 707 including a display, a speaker, and the like. The CPU 701 executes various processes with respect to the information input from the input portion 706, for example.

The storage portion 708 connected to the input and output interface 705 is formed of a hard disk for example and stores programs executed by the CPU 701 and various types of data. Moreover, various types of speech information and dictionary data necessary for the speech recognition and comprehension processes, user image data necessary for the user identification process, and the like are recorded in the storage portion 708. A communication portion 709 communicates with an external device through a network such as the Internet or a local area network.

A driver 710 connected to the input and output interface 705 drives a removable media 711 such as a magnetic disk, an optical disc, a magneto-optical disc, or a semiconductor memory, thereby obtaining programs or data stored in the media. The obtained program or data is transmitted and stored in the storage portion 708 as necessary.

So far, the present disclosure has been described in detail with reference to specific examples. It should be understood by those skilled in the art that various modifications, combinations, sub-combinations and alterations may occur depending on design requirements and other factors insofar as they are within the scope of the appended claims or the equivalents thereof. In other words, having been described based on exemplary embodiments, the present disclosure is not interpreted restrictively. In order to determine the scope of the present disclosure, the section of the claims has to be considered.

Furthermore, a series of processes described in the present specification can be executed by hardware, software, or a configuration including a combination of both. When the process is executed by software, the process can be executed either in a method of installing a program including a process sequence recorded therein in a memory in a computer combined with a dedicated hardware, or in a method of installing a program in a general purpose computer that can execute various types of processes. For example, the program can be recorded in advance in a recording medium. In addition to the method of installing the program to a computer from the recording medium, it is possible to use a method in which the program is received through a network such as LAN (Local Area Network) or the Internet and then installed in a recording medium such as a built-in hard disk.

Moreover, the various types of processes described in the present specification may not only be executed in a time-series manner according to the description but may be executed in a parallel manner or individually according to the process ability of the apparatus executing the process or to the necessity. In addition, the system in the present specification is logical collective configuration of a plurality of devices, and each configurative device is not limited to being in the same case.

The present disclosure contains subject matter related to that disclosed in Japanese Priority Patent Application JP 2010-189123 filed in the Japan Patent Office on Aug. 26, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising a microprocessor comprising a plurality of portions configured to be executed by the microprocessor, comprising:
- a pre-score adjustment portion which calculates a pre-score based on context information obtained as observation information, for an intention model as a unit corresponding to each of a plurality of types of intention information registered in advance;
- a multi-matching portion which determines the most suitable word group for an input speech based on a user's utterance and calculates an acoustic score and a linguistic score to be given to the word group for the intention model as a unit; and
- an intention determination portion which determines intention information corresponding to an intention model achieving the highest total score as an intention corresponding to the user's utterance by comparing total scores calculated from the pre-score, the acoustic score, and the linguistic score of the intention model as a unit,
- a pre-score storing portion in which a pre-score corresponding to a context with respect to each context information corresponding to a plurality of different types of observation information has been registered, wherein
  - the observation information includes the plurality of types of observation information,
  - the pre-score adjustment portion selects the pre-score corresponding to a context that has been registered in the pre-score storing portion based on the context information and calculates a pre-score for the intention model as a unit by applying the selected pre-score corresponding to a context, and
  - the context information as the observation information includes at least information of speech input person identification input from an image processing portion.

2. The apparatus according to claim 1,
wherein the context information as the observation information includes information of speech input microphone identification input from a microphone determination portion, and
the pre-score adjustment portion selects the pre-score corresponding to a context that has been registered in the pre-score storing portion based on the context information and calculates the pre-score for the intention model as a unit by applying the selected pre-score corresponding to the context.

3. The apparatus according to claim 2,
wherein
the pre-score adjustment portion selects the pre-score corresponding to a context which corresponds to a process category selected by the user and calculates the pre-score for the intention model as a unit by applying the selected pre-score corresponding to a context.

4. The apparatus according to claim 2,
wherein the information of speech input person identification is an identified result of a face identification process executed by the image processing portion based on an image captured by a camera of the information processing apparatus, and
the pre-score adjustment portion selects the pre-score corresponding to a context which corresponds to the speech input person identified, and calculates the pre-score for the intention model as a unit by applying the selected pre-score corresponding to a context.

5. The apparatus according to claim 2,
wherein the information of speech input microphone identification is information of a microphone determined to be a microphone from which the speech has been input, which is obtained by the microphone determination portion of the information processing apparatus, and
the pre-score adjustment portion selects the pre-score corresponding to a context which corresponds to the microphone from which the speech has been input, and calculates the pre-score for the intention model as a unit by applying the selected pre-score corresponding to a context.

6. The apparatus according to claim 1,
wherein the intention determination portion calculates a total score for the intention model as a unit by applying pre-set weight corresponding to each of the acoustic score, linguistic score, and pre-score.

7. The apparatus according to claim 1, further comprising:
a pre-score learning portion which receives the input of the determination result of the pre-score determination portion and updates the pre-score corresponding to a context that has been registered in the pre-score storing portion by a learning process performed based on input determination results.

8. An information processing method executed in an information processing apparatus comprising a microprocessor, the method comprising:
- causing a pre-score adjustment portion to calculate a pre-score based on context information obtained as observation information, for an intention model as a unit corresponding to each of a plurality of types of intention information registered in advance;
- causing a multi-matching portion to determine the most suitable word group for an input speech based on a user's utterance and to calculate an acoustic score and a linguistic score to be given to the word group for the intention model as a unit;
- causing an intention determination portion to determine intention information corresponding to an intention model achieving the highest total score as an intention corresponding to the user's utterance by comparing the total scores calculated from the pre-score, acoustic score, and the linguistic score of the intention model as a unit; and
- causing a pre-score storing portion to register a pre-score corresponding to a context with respect to each context information corresponding to a plurality of different types of observation information, wherein
  - the observation information includes the plurality of types of observation information,
  - causing the pre-score storing portion to register further comprises causing the pre-score storing portion to select the pre-score corresponding to a context that has been registered in the pre-score storing portion based on the context information and calculates a pre-score for the intention model as a unit by applying the selected pre-score corresponding to a context, and
  - the context information as the observation information includes at least information of speech input person identification input from an image processing portion.

9. A non-transitory, computer readable medium configured to cause an information processing apparatus to perform information processing comprising:
- causing a pre-score adjustment portion to calculate a pre-score based on context information obtained as observation information, for an intention model as a unit corresponding to each of a plurality of types of intention information registered in advance;
- causing a multi-matching portion to determine the most suitable word group for an input speech based on a user's utterance and to calculate an acoustic score and a linguistic score to be given to the word group for the intention model as a unit;

causing an intention determination portion to determine intention information corresponding to an intention model achieving the highest total score as an intention corresponding to the user's utterance by comparing the total scores calculated from the pre-score, the acoustic score, and the linguistic score of the intention model as a unit; and causing a pre-score storing portion to register a pre-score corresponding to a context with respect to each context information corresponding to a plurality of different types of observation information, wherein the observation information includes the plurality of types of observation information, causing the pre-score storing portion to register further comprises causing the pre-score storing portion to select the pre-score corresponding to a context that has been registered in the pre-score storing portion based on the context information and calculates a pre-score for the intention model as a unit by applying the selected pre-score corresponding to a context, and the context information as the observation information includes at least information of speech input person identification input from an image processing portion.

* * * * *